UNITED STATES PATENT OFFICE.

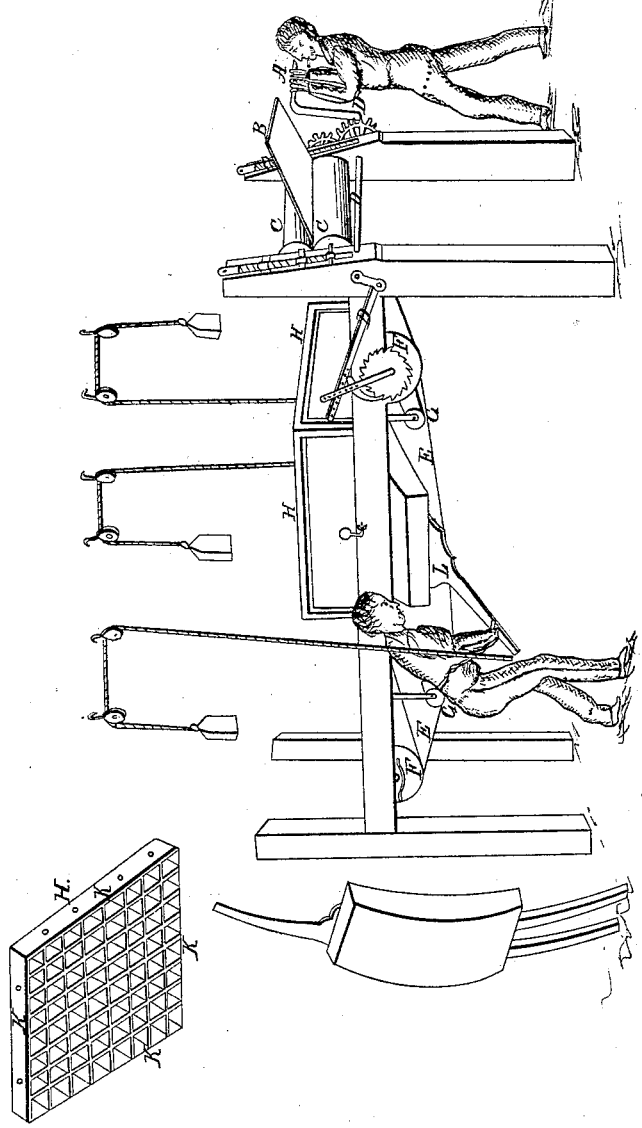

CHARLES P. FORBES, OF BALTIMORE, MARYLAND.

MACHINE FOR CUTTING CRACKERS.

Specification of Letters Patent No. 2,180, dated July 17, 1841.

*To all whom it may concern:*

Be it known that I, CHARLES P. FORBES, of the city of Baltimore and State of Maryland, have invented an Improvement in Machines for Making Crackers, which is described as follows, reference being had to the annexed drawings of the same, making part of this specification.

My improvement is in the cutting and docking part of the machine for square crackers and the application of power to perform the cutting and docking of the dough into crackers and the manner of placing the same on the peels.

To enable others skilled in the art to make and use my invention, I will proceed to describe its construction and operation: A, the crank which propels the machine; B, the hopper upon which the dough is placed; C, the two rollers placed at the end of the hopper through which the dough is drawn and rolled to its proper thickness; D, the connecting rod which is attached to the crank shaft by means of a crank at one end and to the drum shaft (which propels the apron) at the other end by means of a ratchet wheel, &c.; E, a revolving apron which receives the dough from the rollers and conveys it under the cutting box by means of the drums F, F, which are propelled by the connecting rod D; G, G, the two small rollers placed between the drums F, F, but lower down to afford room for the operation of the lever which is suspended between the upper and lower part of the revolving apron; H, H, the cutting and docking box which is placed on top of the machine with the face of the cutters and dockers downward and is composed of ash plank three inches thick and five wide doweled together to form the size of the cutting plate.

To the sides of the plank or cutting box so called are fastened inch plank which rise four inches and are covered with boards at the top, which forms a space at the top of the plank for the weights (to keep them from the dust) which are attached to pistons which pass down through the plank to the clearers which force the dough out of the cutting plate and dockers. The cutting plate (see drawings No. 1) is fastened on to the bottom of the plant and should be composed of cast brass, the size of which should be regulated by the number of ovens to be employed—for 8 ovens a plate 14 by 16 inches square is sufficient. The dockers are fastened to the plank by screws. The cutting plate should be cast so as to have the outside edge K, K, K, K, (drawing No. 1) project the twentieth of an inch from the plank more than the rest and the points of the docker teeth should be brought on a level with the outside edge of the cutting plate.

L the lever should be placed directly under the cutting and docking box between the upper and lower part of the revolving apron, and should be six feet long made of three inch ash plank, one end of which should be worked down so as to answer for a handle, and the middle part should be the same width of the cutting and docking plate with a projection on the top with an oval face made of poplar or pine plank (glued together) to force the dough up into the cutters and dockers—the back end of the lever should project behind the machine the same distance that it does in front to the back end of which is attached two ropes which pass through pulleys at the ceiling to which are attached weights—the other end of the lever is also suspended by one rope pulleys and weights.

The operation is as follows: The dough being placed upon the inclined board and the machine put in motion, the dough passes through the rollers C, where it is brought to its required thickness it is then received on the apron E and is conveyed under the cutting box H, H, when the lever L is raised which forces the dough up into the cutters and dockers, the lever then rests on the rails or sides of the machine and the dough is forced back upon the apron by the cleaners and weights; the apron is now conveyed at one revolution of the crank shaft (A) the breadth of the cutting and docking plate when the lever L is returned downward and the oval projection passes back forces the dough as before up into the cutters and dockers, the instant the lever strikes the rails or sides of the machine (when the machine is in motion) the oval projection falls sufficient for the apron to pass along and the fall of the apron should be only the eighth of an inch more than the thickness of the dough. A boy can attend to the lever it being suspended at each end by equal weights requiring but small exertion and he having the ratchet wheel for his guide raises or lowers the lever the instant the ratchet wheel stops. The dough is taken from the apron with a paddle the same size of the cutting and docking plate as it passes over the drum at the end of the machine and is then slid off onto the peels. Two peels are required although but one man to place the dough in the ovens.

The length of the crank which propels the machine should be 16 inches and the diameter of the cog wheel together with that of the drums which propel the apron should be regulated according to the size of the cutting and docking plate and that according to the number of ovens to be employed.

What I claim as my invention and desire to secure by Letters Patent is—

1. Making the edge of the outside cutters project beyond the edge of the inside cutters, and have the points of the dockers on a level with the edge of the outside cutters as herein described, so as to dock and cut the outside edge through while the inner cutters do not cut sufficiently far to separate the crackers.

2. And I also claim the method herein described of cutting the dough by having the cutters and dockers permanent, and pressing the upper part of the belt or apron on which the dough is placed up against the cutters and dockers by means of a curved plate attached to a lever drawn up by weights and guided by hand in the manner herein fully described.

CHARLES P. FORBES.

Witnesses:
W. B. LEWIS,
JNO. W. WELLS.